Patented Feb. 9, 1926.

1,572,742

UNITED STATES PATENT OFFICE.

HANS MEERWEIN, OF KONIGSBERG, GERMANY, ASSIGNOR TO FARBENFABRIKEN VORM. FRIEDR. BAYER AND CO., OF LEVERKUSEN, NEAR COLOGNE-ON-THE-RHINE, GERMANY.

PRODUCTION OF ALCOHOLS FROM HALOGENATED ALDEHYDES.

No Drawing. Application filed May 23, 1925. Serial No. 33,505.

*To all whom it may concern:*

Be it known that I, HANS MEERWEIN, a citizen of Germany, residing at Konigsberg, State of Prussia, Germany, have invented new and useful Improvements in the Production of Alcohols from Halogenated Aldehydes, of which the following is a specification.

My invention relates to a valuable improvement in the manufacture and production of alcohols from halogenated aldehydes. The new process consists in treating halogenated aldehydes dissolved in primary alcohols with alcoholates or halogenated alcoholates of aluminum or mixtures thereof.

In order to illustrate my new process more fully, the following example is given:—

150 grams of butylchloral $CH_3$—CHCl—$CCl_2$—CHO are dissolved in 400 cubic centimeters of ethylalcohol. 45 grams of molten aluminum ethylate are added and the mixture is heated to boiling in a vessel provided with a reflux condenser while a current of nitrogen or hydrogen is led through the vessel. The vessel is immersed in a bath heated to 135° C. When the development of acetaldehyde ceases (after about 1½ hours) the ethylalcohol is distilled off (temperature of the bath up to 120° C.), the residue is acidulated with 150 cubic centimeters of 2N sulfuric acid and distilled with steam. The trichlorobutylalcohol $CH_3$—CHCl—$CCl_2$—$CH_2$—OH solidifies in the cooler. It melts at 62° C.

The reaction proceeds according to the following equation:

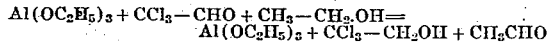

In the same way other halogenated aldehydes can be used, e. g., chloral, $CCl_3$—CHO, bromal, $CBr_3$—CHO, monochlorocroton aldehyde $CH_3$—CH=CCl—CHO, etc.

I claim:—

1. The process for producing halogenated alcohols from halogenated aldehydes, which process comprises the treatment of halogenated aldehydes dissolved in primary alcohols with alcoholates of aluminum.

2. The process for producing halogenated alcohols from halogenated aldehydes, which process comprises the treatment of halogenated aldehydes dissolved in primary alcohols with halogenated alcoholates of aluminum.

In testimony whereof I have hereunto set my hand.

HANS MEERWEIN.